US010628442B1

(12) United States Patent
Naskar et al.

(10) Patent No.: US 10,628,442 B1
(45) Date of Patent: Apr. 21, 2020

(54) HISTOGRAMS BASED ON VARYING DATA DISTRIBUTION

(71) Applicant: HEWLETT PACKARD ENTERPRISE DEVELOPMENT LP, Houston, TX (US)

(72) Inventors: Subrata Naskar, Bangalore (IN); J. P. Naveen, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 16/185,051

(22) Filed: Nov. 9, 2018

(51) Int. Cl.

| | |
|---|---|
| ***G06F 16/26*** | (2019.01) |
| ***G06T 11/20*** | (2006.01) |
| ***G06F 16/248*** | (2019.01) |
| ***G06F 16/22*** | (2019.01) |

(52) U.S. Cl.
CPC .......... *G06F 16/26* (2019.01); *G06F 16/2282* (2019.01); *G06F 16/248* (2019.01); *G06T 11/206* (2013.01)

(58) Field of Classification Search
CPC .... G06F 16/26; G06F 16/248; G06F 16/2282; G06T 11/206
See application file for complete search history.

(56) References Cited

U.S. PATENT DOCUMENTS

| | | | | |
|---|---|---|---|---|
| 6,178,382 | B1 | 1/2001 | Roederer | |
| 7,624,094 | B2 | 11/2009 | Ellis | |
| 8,653,993 | B2 | 2/2014 | Bendel | |
| 8,949,224 | B2 * | 2/2015 | Gupta | G06F 16/254 707/718 |
| 9,244,957 | B1 * | 1/2016 | Korlapati | G06F 16/24542 |
| 2008/0046455 | A1 * | 2/2008 | Behm | G06F 16/24539 |
| 2013/0236095 | A1 * | 9/2013 | Hitomi | G06T 5/002 382/167 |
| 2014/0114950 | A1 * | 4/2014 | Halverson | G06F 16/24542 707/713 |

(Continued)

OTHER PUBLICATIONS

Jagadish et al., "Optimal Histograms with Quality guarantees", Proceedings of the 24th International Conference on Very Large Data Bases, New York, USA, 1998, pp. 275-286.

(Continued)

*Primary Examiner* — Maurice L. McDowell, Jr.
*Assistant Examiner* — Donna J. Ricks
(74) *Attorney, Agent, or Firm* — Nolte Intellectual Property Law Group

(57) ABSTRACT

Systems and methods for producing histograms are disclosed. One method for producing a histogram includes processing a database table to produce a grouped result set, and dividing the grouped result set into a plurality of collections with each collection containing one or more intervals of the grouped result set. Further, for each collection containing one or more intervals, the method includes determining one or more statistical parameters characterizing a distribution of the data within the collection. Still further, for each collection, the method includes applying one of a plurality of different histogram-producing algorithms based on the one or more statistical parameters to produce a histogram such that at least two of the different histogram-producing algorithms are used to render a respective different portion of the histogram.

20 Claims, 7 Drawing Sheets

(56) References Cited

U.S. PATENT DOCUMENTS

2015/0220617 A1* 8/2015 Luo ........................ G06F 16/285
707/737

OTHER PUBLICATIONS

Matias et al., "Wavelet based histograms for selectivity estimation", Proceedings of the 1998 ACM SIGMOD international conference on Management of data, 1998, pp. 1-12.
Piatetsky-Shapiro et al., "Accurate estimation of the number of tuples satisfying a condition", In Proc. 1984 ACM-SIGMOD Conference on the Management of Data, Boston, MA, Jun. 1984, pp. 256-276.
Surajit Chaudhuri, "An Overview of Query Optimization in Relational Systems", ACM 1998, pp. 34-43.
Chinar Aliyev, "Histogram Construction in Oracle Database 12c," Retrieved from Internet Sep. 27, 2018, <https://www.oracle.com/technetwork/articles/database/histogram-construction-oracle-12c-4426845.html>.
Donko Donjerkovic, "Dynamic Histograms: Capturing Evolving Data Sets," Dec. 31, 2008, <http://pages.cs.wisc.edu/~donjerko/hist.pdf>.

* cited by examiner

400

```
FOR EACH FETCH

DO
  IF ( (Pearson Coefficient > 1.0 OR Pearson Coefficient < -1.0 )
     AND ( RowsPerFetch/(size or number of rows grouped result in fetch) > AverageRowCountPrefetch )
     AND ( MemoryRequirementsSatisfied ) )
     trigger MemorySensitiveHistogramAlgorithm;

  ELSE IF ( (Pearson Coefficient > 0.5 OR Pearson Coefficient < -0.5 )
     AND (IBF <= MaxLimitForOptimalHistogram ) )
     trigger OptimalHistogramAlgorithm;
     // Note MaxLimitForOptimalHistogram is a constant tuned for the Optimal Histogram

  ELSE IF ( Grouped result set size <= IBF )
     trigger FrequencyHistogramAlgorithm;

  ELSE
     trigger EquiHeightHistogramAlgorithm;

END DO
```

FIG. 4

DB TABLE

|     | C1 | C2 | C3 | C4 | C5 |     |
| --- | --- | --- | --- | --- | --- | --- |
| R1  |    |    |    |    |    | ← 510 |
| R2  |    |    |    |    |    |     |
| R3  |    |    |    |    |    |     |
| R4  |    |    |    |    |    |     |
| .   |    |    |    |    |    |     |
| .   |    |    |    |    |    |     |
| .   |    |    |    |    |    |     |
|     | < DATA TYPE 1 > | < DATA TYPE 2 > | < DATA TYPE 3 > | < DATA TYPE 4 > | < DATA TYPE 5 > | |
| RM  |    |    |    |    |    |     |

GROUPED RESULT SET — 520

|     | (C1, C2) | # OCCURENCES |
| --- | --- | --- |
| R1  |    | < OC - 1 > |
| R2  |    | < OC - 2 > |
| .   |    | < OC - 3 > |
| .   |    | < OC - 4 > |
| .   |    |            |
|     |    | .          |
|     |    | .          |
|     |    | .          |
| RN  |    | < OC - N > |

522-1 brackets rows R1–R4

HISTOGRAMS BASED ON VARYING DATA DISTRIBUTION

BACKGROUND

A histogram is a graphic representation of some form of numerical data. Histograms typically take the shape of consecutive, non-overlapping rectangles that together approximate a distribution of data. In practice, each rectangle of a histogram has a width and a height with the width representing a "class" or "range" of values, and the height representing a proportion of items found in a given class/range.

BRIEF DESCRIPTION OF THE DRAWINGS

Various examples of this disclosure that are proposed as examples will be described in detail with reference to the following figures, wherein like numerals reference like elements, and wherein:

FIG. 4 is an example of computer script for selecting one of a plurality of histogram-producing algorithms.

DETAILED DESCRIPTION

Figure 1:
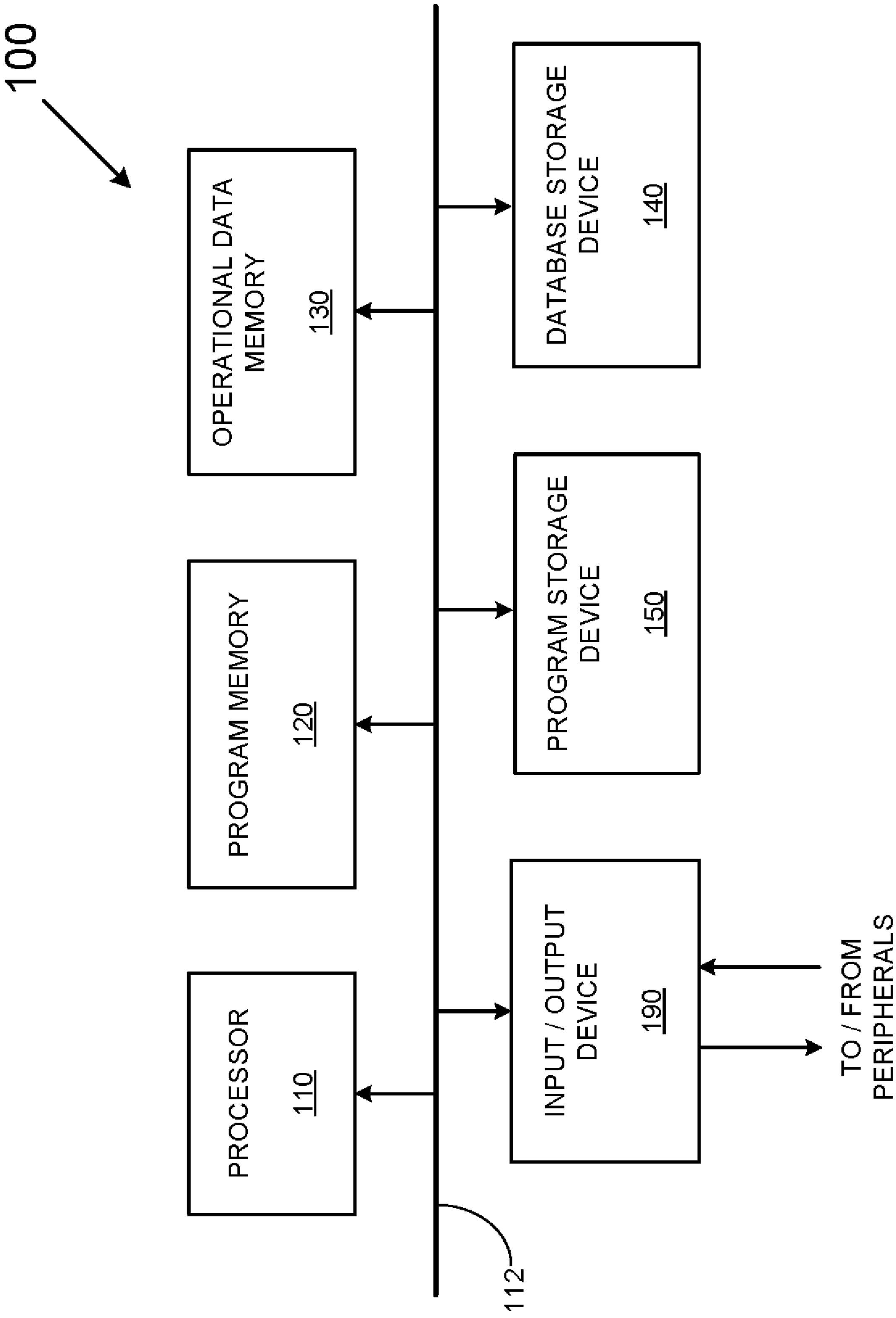
FIG. 1 is an example of a generalized block diagram of a histogram processing system.

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

A particular challenge that SQL (Standard Query Language) and other database professionals are tasked with is generating an optimal planned approach for a given database query. Multi-column histograms, as compared with single-column histograms, play a big role due to an ability to better capture the relationships between columns of data within a given database table. Understanding such relationships allows a database professional to produce an improved query plan. However, the quality of an improved query plan typically comes at the costs of: (1) an increased processing overhead to update the underlying statistics of multi-column relationships in a given table; and (2) an increased complexity and overhead.

In order to produce an improved query plan, it is beneficial to equip a database professional with some characteristics of the data distribution and patterns within a data set. These characteristics include data statistics/histogram statistics, or just "statistics." In practice, accurate statistics for database tables have the ability to greatly help a database professional to select and tailor different histogram types, such as the Frequency/EquiWidth histogram, the EquiHeight histogram, the Wavelet histogram, and the "Optimal" histogram.

Each of these various histograms has its strengths and weaknesses.

For example, the Frequency histogram divides data into equal ranges/intervals (known as "bins" or "buckets"), adds all occurrences within each respective range, then displays the sum of each respective range as a relative height. The Frequency histogram has an advantage of being simple to implement while requiring a relatively low amount of computer resources. The Frequency histogram is also easy to update.

Another type of histogram, known as the Optimal histogram, uses data partitioning rules designed to minimize the variance of data among the available buckets, which tends to minimize overall error. While the Optimal histogram will likely produce more accurate results than the Frequency histogram for a given data set, the Optimal histogram is computationally more expensive and has a higher memory usage as compared to other histogram types. Further, any changes to a source parameter could potentially result in having to re-build the histogram entirely, rather than allow for an incrementally update of an existing histogram.

In contrast to the Optimal histogram, the Frequency histogram does not have these problems. While the EquiDepth histogram will experience the above-described issues of the Optimal histogram, because EquiDepth histogram construction is simpler, there is a lower cost to maintain EquiDepth histograms as compared to the Optimal histogram.

While different histogram-producing algorithms can be selected and tailored for known data distribution types, such an inverse frequency distribution or a Poisson distribution, real-world data does not always present itself with such mathematical precision. While this may not appear to be a problem for small data sets where every sample in a database can have a visible effect in a rendered histogram, the problem may be very problematic for large data sets.

For example, for a data set of one hundred-million distinct entries, it is generally acceptable to use a small portion of such entries with an assumption that, from a statistical point of view, the small portion can generate a histogram that is a reasonably accurate approximation of the whole of the data. However, even with this reduced set of data, the accuracy of a given histogram may be questionable when the type of histogram-producing algorithm cannot appropriately capture a particular data distribution, such as when an unexpected data artifact occurs and/or when actual data distribution follows an unexpected pattern.

This problem is complicated by the fact that, in general practice, there is no one histogram that can practically address all forms of data distribution. For example, the EquiHeight algorithm may not be able to capture and classify various data patterns (e.g., Uniform, Poisson, and Zipf) or levels of skewness in various parts of a data set, which in turn may result in erroneous selectivity estimates for correlated multi-column predicates in a given query. This, in turn, may substantially affect the quality of a query plan.

To address these problems, the inventors of the disclosed methods and systems have devise a new and useful approach that has a number of distinct advantages, such as providing/maintaining an increased accuracy for histograms of large data sets while maintaining relatively low processing requirements if not reducing processing requirements. Accordingly, the disclosed histogram-producing processes not only represent an improvement in the art of histogram production but represent an improvement in any machine that implements such processes by virtue of at least lower histogram rendering times for a given histogram quality.

In general, the disclosed methods and systems employ a "divide and conquer" methodology for rendering histograms that takes into account that any number of different histogram-producing algorithms may be used to render different portions of a single histogram.

Further, while any number of different statistical criteria may be used to select a particular histogram-producing algorithm, the present disclosure focuses on a degree of skew ("skewness") in any particular data range to determine the appropriate algorithm for that range. For example, a localized data pattern may be characterized based on Pearson's median skewness coefficient, which is defined as 3 (Mean−Mode)/Standard Deviation. The amplitude of the skewness coefficient, in turn, may be used to select computationally-intensive histogram-producing algorithms only when necessary. Thus, the disclosed methods and systems have an advantage in that they balance the total elapsed time in rendering and updating histograms with the accuracy of a resultant histogram.

Accordingly, the presently-disclosed methods and systems provide a practical and unique approach to render histograms where the form of processing adaptively varies from one portion of a data set to another portion.

In addition to the above-described advantages, the disclosed methods and systems allow a user's specific choice of a particular histogram-producing algorithm to be ignored in favor of any number of better suited histogram-producing algorithm based upon the nature of the data. Thus, when a user's selected histogram-producing algorithm is a poor match with existing localized data, a more suitable histogram-producing algorithm can be applied. Accordingly, optimal outcomes in terms of capturing significant interval boundaries in a histogram can be maintained on a per fetch (or other piecemeal) basis. This advantage is not found in known approaches that only consider the distribution of data across an entire data set, i.e., in a non-piecemeal way.

Still further, the disclosed methods and systems allow for histogram generation to be implemented using any number of standard command sets from a particular database vendor without impacting fundamental operations. For instance, SQL's standard "RANDOM," "PERIODIC," and "UPDATE STATISTICS" commands are readily usable to implement the techniques discussed below without the need to develop specialized custom statistical software.

FIG. 1 depicts a block diagram of an example of a histogram processing system 100 capable of providing a variety of database-related services including services that produce histograms from an available data source. As shown in FIG. 1, the example histogram processing system 100 includes a processor 110 (e.g., a Central Processing Unit (CPU)), a program memory 120, an operational data memory 130, a database storage device 140, a program storage device 150, and an input/output device 190. The above components 110-190 are communicatively coupled together by a control/data bus 112.

Although the histogram processing system 100 of FIG. 1 uses a bussed architecture, it should be appreciated that any other architecture may be used as is well. For example, in various examples, the various components 110-190 can take the form of separate electronic components coupled together via a series of separate busses.

Still further, in other examples, one or more of the various components 110-190 can take form of separate servers coupled together via one or more networks. Additionally, it should be appreciated that each of components 110-190 advantageously can be realized using multiple computing devices employed in a cooperative fashion. For example, by employing two or more separate computing devices, e.g., servers, to provide separate processing and data-handling needs, processing bottlenecks can be reduced/eliminated and the overall computing time to produce histograms and other services can be drastically reduced.

It also should be appreciated that some processing, typically implemented in software/firmware routines residing in program memory 120, alternatively may be implemented using dedicated processing logic. Still further, some processing may be performed by software/firmware routines residing in separate memories in separate servers/computers being executed by different controllers.

In operation, the histogram processing system 100 can first perform a number of setup operations including transferring an operating system and a number of appropriate program(s) from the program storage device 150 to the program memory 120. Thereafter, the processor 110 can perform any number of processes based on user commands provided via the input/output device 190, which provides an interface with external networks as well as with user peripherals, such as displays and keyboards.

During operation, the histogram processing system 100 can populate the database storage device 140 with any number of database forms including single and multi-column database tables. Once the histogram processing system 100 is appropriately configured and has at least one database table to operate upon, the histogram processing system 100 may be used to generate any number of histograms, including hybrid histograms. A "hybrid histogram" is herein defined as a histogram that employs a plurality of different histogram-producing algorithms in a way such that at least two of the different histogram-producing algorithms are used to render different portions of a given histogram.

The remaining relevant processes of this disclosure that are performed by the histogram processing system 100 are outlined below with respect to the flowcharts of FIG. 2 and FIG. 3.

Figure 2:
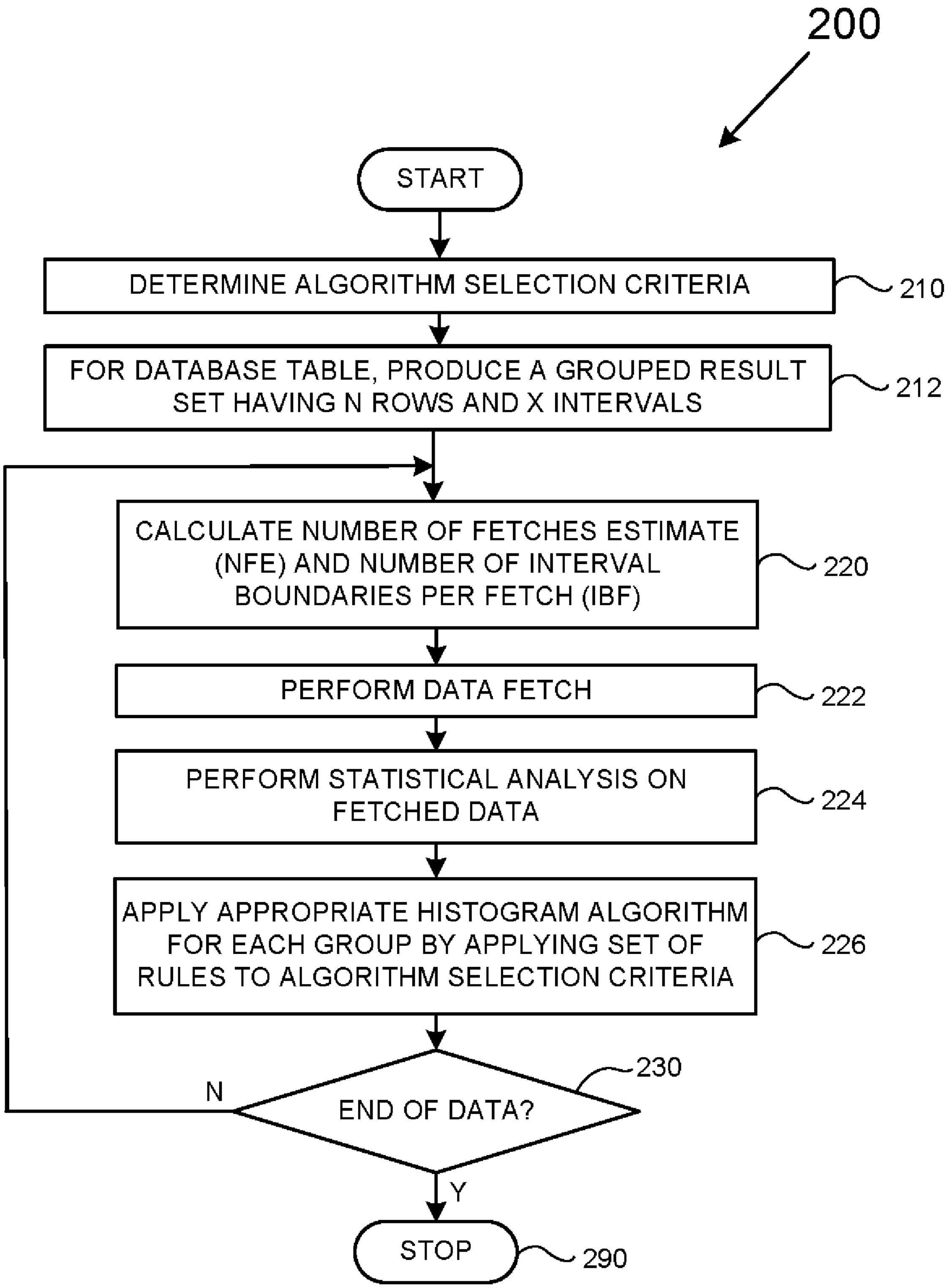
FIG. 2 is a flowchart depicting a method usable to produce hybrid histograms

FIG. 2 is a flowchart depicting a method 200 usable to produce hybrid histograms. It is to be appreciated to those skilled in the art in light of this disclosure that, while the various operations of FIG. 2 are shown according to a particular order for ease of explanation, that certain operations may be performed in different orders or performed in a parallel fashion.

The method 200 starts at block 210 where the particular criteria used to select particular histogram-producing algorithms is determined. That is, a number of tests may be selected/designed based on one or more parameters with each parameter characterizing some aspect of a distribution of the data within a particular database table.

Such tests may take any form, but statistical tests are envisioned as particularly useful. Such statistical tests may be based on, for example, the amplitude (absolute or signed) of a skewness parameter based on a single type of skewness calculation (e.g., Pearson's second/median skewness or Pearson's first/mode skewness), the amplitudes of multiple skewness parameters based on different types of skewness calculations, the amplitudes of a skewness parameter and rate of change of skewness parameter, the amplitude of a parameter based upon a correlation of data against a particular waveform (e.g., does the data resemble a sawtooth waveform or have an AC component that resembles a sinc function?), the amplitude of a parameter related to periodicity, and so on.

Accordingly, it is envisioned that, in various examples that employ a particular statistical parameter, some particular range or sets of range values may be used. For instance, if a skewness parameter is used, then it may be desirable to compare the skewness parameter to a first numeric range to determine whether a first histogram-producing algorithm should be used, a second numeric range (different from the first) to determine whether a second histogram-producing algorithm should be used, and so on. Such numeric ranges may be pre-set or may be configurable by a database user.

Still further, algorithm selection may be based on practical processing constraints. For example, an available amount of memory, such as Random Access Memory (RAM), may be used as criteria for certain algorithms that require large amounts of operable data memory and/or program memory. Similarly, algorithm selection may be based on an amount of logical memory space available on a given histogram processing system. Still further, algorithm selection may be based on other criteria mentioned below.

In 212, for a given database table for which a histogram is to be rendered, a grouped result set is produced having N number of rows and X number of intervals such that each interval contains NIX rows. Additional description of this operation can be found in FIG. 5 and its respective text below. For the purposes of this disclosure, the term "grouped result set" is defined as a result set generated of raw table data on a storage medium, such as a magnetic storage disk, by selecting and intermediate grouped and sorted data set, which acts as the source for a histogram generation for a multicolumn group.

In various examples related to SQL, a query can take the following form to generate a grouped result set: "SELECT [columns involved in the multi column group separated by delimiter ','], COUNT(*) GROUP BY [columns involved in the multi column group separated by delimiter ','] ORDER BY columns involved in the multi column group separated by delimiter ','], where "SELECT," "GROUP BY," and "ORDER BY" are SQL Keywords, and "COUNT(*)" represents the frequency/occurrence(s) of a unique presence of a multi-column group's combination of values in an entire dataset. It is to be appreciated that, for a particular grouped result set, each combination of columns of a multi-column group may be unique. Accordingly, each resultant histogram interval/bin/bucket will be an ordered range representation of multiple unique values present in the grouped result set. Multicolumn histogram intervals/bins/buckets can be generated using grouped result sets where: (1) the first value of histogram interval/bucket boundary represents the first multicolumn combinatorial unique value of the grouped result set, and (2) the last value of histogram interval/bin/bucket boundary represents last combinatorial unique value of grouped result set.

In 220, for a given grouped result set, a Number of Fetches Estimate (NFE) and a number of Interval Boundaries per Fetch (IBF) are calculated.

The NFE is defined as the number of fetch operations needed to retrieve an entire grouped result set from a database storage device into operational data memory. A fetch operation is defined as an operation that retrieves a portion of a grouped result from a database storage device into operational data memory. For the purpose of the present description, the data retrieved from database storage and placed in an operational data memory in a given fetch operation is referred to a "collection" of one or more intervals of data unless otherwise expressly indicated. That is, each fetch operation is defined as an operation that "fetches" a respective collection containing one or more intervals of data. However, it is to be appreciated that, according to other processing examples, a "collection" of data need not necessarily be the same data as is retrieved by a given fetch operation. For example, in theory a "collection" of data may constitute the data retrieved by any number (integer or otherwise) of fetches or defined as a portion of data retrieved in a single a fetch operation.

In contrast to an NFE, an IBF is defined as a number of intervals of a collection containing one or more intervals retrieved in a respective fetch operation. For a SQL-related example, IBF may be calculated as equal to: (MAX_LIMIT_ON_INTERVALS {which is guidance typically provided by a user}—Intervals Already Consumed)/NFE. Note that the "Intervals Already Consumed" parameter starts at zero (0) at the beginning of the first fetch and, at the end of processing "Intervals Already Consumed" will be have a value that depends upon the nature of data and the algorithm applied on the data.

As will be shown below, it is to be appreciated that an IBF can be used as criteria in order to determine whether or not to apply at least one type of histogram-producing algorithm.

Additional details for calculating NFE and IBF values are discussed in more detail with respect to FIG. 5 below.

In 222, a fetch operation is performed such that one or more collections of data intervals from a grouped result set is/are retrieved from a database storage device into some form of operating data memory. It should be appreciated that separate fetch operations enable each collection containing one or more intervals to be separately extracted from database storage to the operational data memory before applying at least one of a plurality of histogram-producing algorithms to the each separately extracted collection containing one or more intervals. This, in turn, allows a histogram to be incrementally rendered using reduced memory resources.

In 224, a statistical analysis is performed. As discussed above with respect to operation 210, a test using a statistical analysis can take a wide variety of forms. However, in the present example, the statistical analysis is limited to determining skewness.

In 226, an appropriate histogram-producing algorithm is applied to the collection of data intervals fetched in operation 222. Determining the appropriate algorithm-producing algorithm in the present example can be a function of the algorithm selection criteria determined in operation 210, the statistical analysis of operation 224, the amount of available memory, and the IBF value calculated in operation 220. Further details are discussed below with respect to FIG. 3.

In 230, a determination is made as to whether or not additional data needs to be processed. If there is no more data to be processed, then operation continues to 290 where the operations of FIG. 2 stop; otherwise, operation jumps back to 220 where the operations of 220-226 are repeated.

It is to be appreciated that the histogram data generated herein may be stored on some storage medium, such as the database storage device 140 of FIG. 1. Once stored, such histogram data may be used by a SQL (or other) compiler to generate a query plan.

Figure 3:
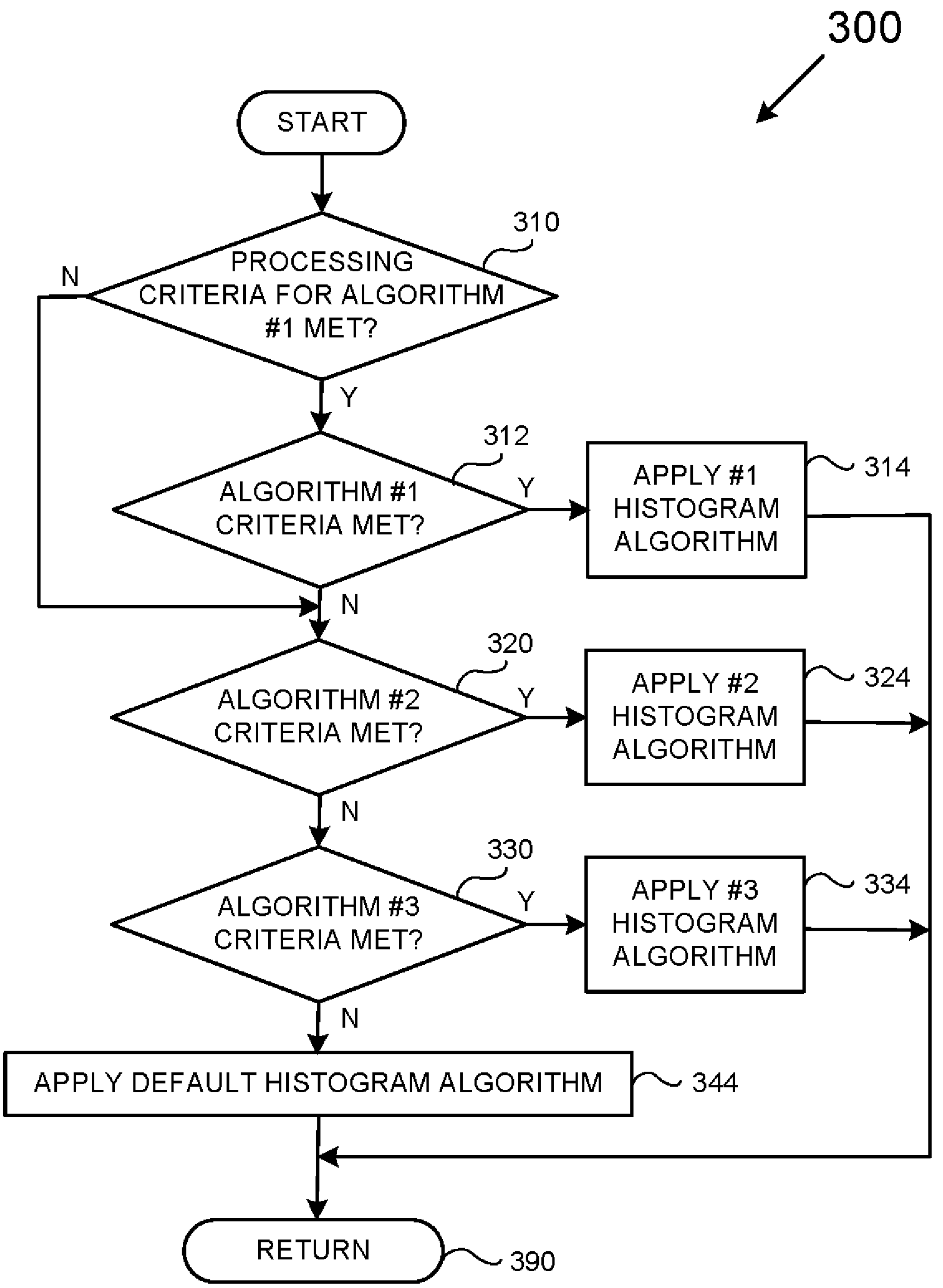
FIG. 3 is a flowchart depicting a method usable to select one of a plurality of histogram-producing algorithms.

FIG. 3 is a flowchart outlining a method 300 to select one of a plurality of different histogram-producing algorithms with reference to block 226 of FIG. 2. As with FIG. 2, it is to be appreciated to those skilled in the art that, while the various operations of FIG. 3 are shown according to a particular order for ease of explanation, that certain operations may be performed in different orders or in a parallel fashion. It is also to be appreciated that labels, such as "first," "second" and so on are not to be interpreted as indicators of a required order of operations, but merely used to distinguish between different operations having similar rolls or functionality.

A purpose embedded within the flowchart 300 is to, for each collection containing one or more intervals (fetched according to the flowchart of FIG. 2), apply one of a plurality of histogram-producing algorithms based on one or more statistical parameters. This allows for the rendering of a "hybrid histogram," which again is defined as a histogram that employs a plurality of different histogram-producing algorithms in a way such that at least two of the different histogram-producing algorithms are used to render different portions of a given histogram.

The process starts in 310 where it is determined whether one or more specific processing-related criteria is/are satisfied. Such criteria may be used in order to apply a first histogram-producing algorithm for a given collection of data. Note that, while processing-related criteria is addressed for only a single histogram-producing algorithm according to FIG. 3, that processing-related criteria may be applied to select any number of different histogram-producing algorithms.

As mentioned above, while a collection of data may be represented by a single fetch operation in various examples, there is no such requirement unless expressly indicated to the contrary. As is also mentioned above, the processing criteria may take any number of forms, such as the available operational data memory, time constraints, appropriate IBF and so on. If the specific processing criteria of 310 is satisfied, then operation continues to 312; otherwise, the operation jumps to 320.

In 312, a determination is made as to whether or not specific algorithm-related criteria is satisfied, e.g., whether a particular statistical parameter conforms with a predetermined range, in order to use a first histogram-producing algorithm. As mentioned above, such criteria may take the form of any combination of data skew, rate of change of data skew or any other statistically significant aspect of the data under consideration. If the specific algorithm criteria is/are satisfied, then operation jumps to 314; otherwise, the operation continues to 320.

In 314, a first histogram-producing algorithm is applied to render a portion of a histogram representing the particular collection of data currently being processed. Operation then jumps to 390.

In 320, a determination is made as to whether a second set of specific algorithm-related criteria is satisfied. If the second specific algorithm-related criteria is/are satisfied, then operation jumps to 324; otherwise, the operation continues to 330.

In 324, a second histogram-producing algorithm is applied to render a portion of a histogram representing the particular collection of data currently being processed. Operation then jumps to 390.

In 330, a determination is made as to whether a third set of specific algorithm criteria is satisfied. If the third specific algorithm criteria is/are satisfied, then operation jumps to 334; otherwise, the operation continues to 344.

In 334, a third histogram-producing algorithm is applied to render a portion of a histogram representing the particular collection of data currently being processed. Operation then jumps to 390.

In 344, a default histogram-producing algorithm is applied to render a portion of a histogram representing the particular collection of data currently being processed. Operation then jumps to 390.

In 390, a return operation is performed indicating that the operations of FIG. 3 are completed or otherwise satisfied, and that other operations may be addressed.

FIG. 4, which is related to FIG. 3, represents an example of computer script 400 usable to select one of a plurality of histogram-producing algorithms. As shown in FIG. 4, the computer script 400 first addresses, merely as an example, a "proprietary" histogram-producing algorithm that is memory intensive and that should: (1) satisfy a memory requirement, and (2) satisfy a condition where an absolute value of a Pearson's skewness coefficient exceeds a first value, e.g., 1.0.

Should both the memory constraints and the Pearson's skewness coefficient test be satisfied, then the example proprietary histogram-producing algorithm is used to render a portion of a histogram for the collection containing one or more intervals currently being considered.

However, should either or both the memory constraints and the Pearson's skewness coefficient test not be satisfied, then it is next determined whether or not a second set of criteria, which is different from the first set of criteria, is satisfied. In the present example of FIG. 4, the second set of criteria includes whether the absolute value of the Pearson's skewness coefficient exceeds a second value, e.g., 0.5, and whether the relevant IBF is less than or equal to a maximum limit tuned for the Optimal histogram.

Should the second set of criteria be satisfied, then the Optimal histogram is used to render a portion of a histogram for the collection containing one or more intervals currently being considered.

However, should the second criteria not be satisfied, then it is determined whether a third set of criteria, which is different from both the first set of criteria and the second set of criteria, is satisfied. In the present example of FIG. 4, the third criteria includes whether the relevant IBF is greater than the collection of data, i.e., the grouped result set size.

Should the third set of criteria be satisfied, then the Frequency histogram is used to render a portion of a histogram for the collection containing one or more intervals currently being considered.

However, should the third set of criteria not be satisfied, then a default histogram-producing algorithm, e.g., the EquiHeight histogram, is used to render a portion of a histogram for the collection containing one or more intervals currently being considered.

Figure 5:
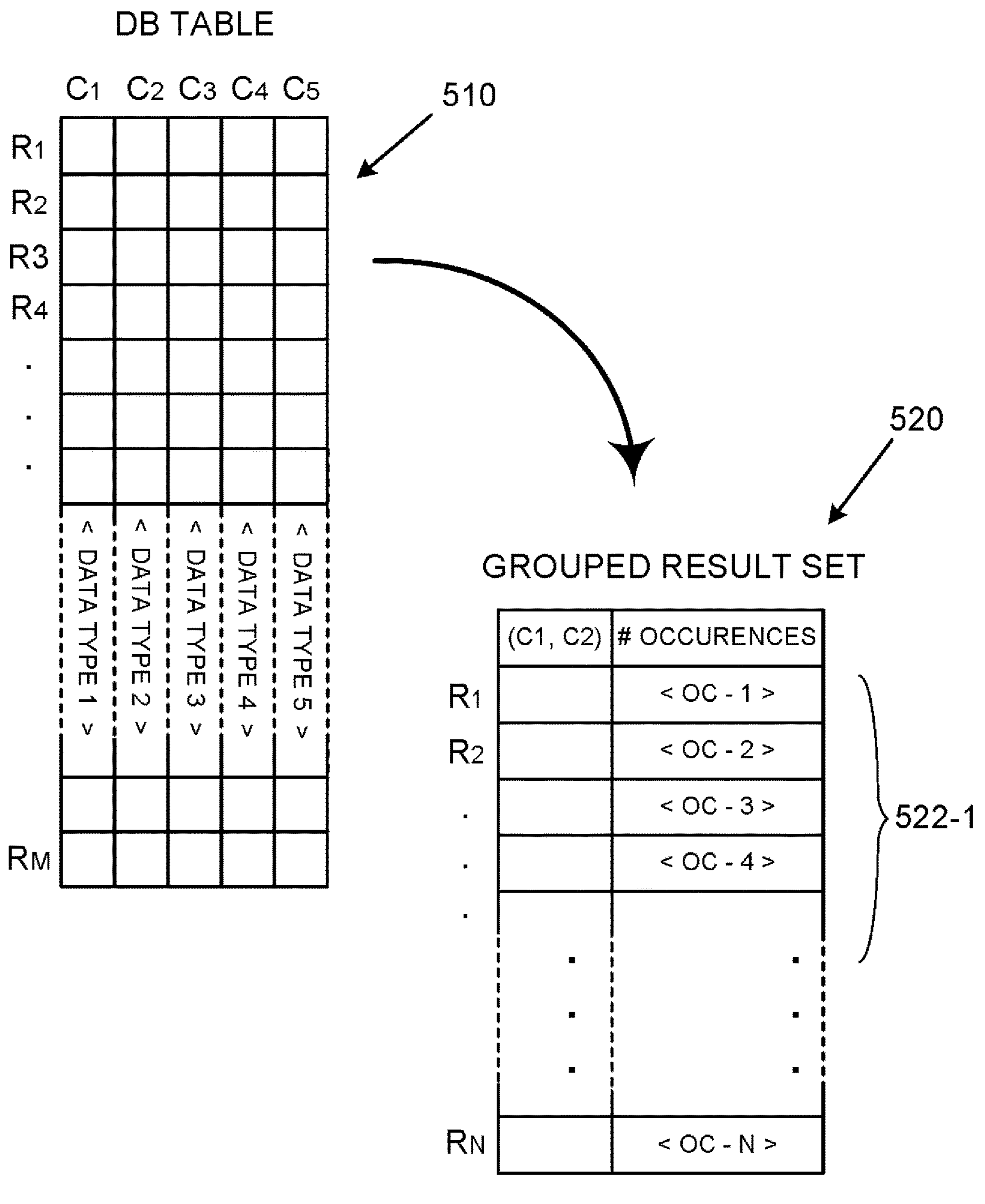
FIG. 5 represents a relationship between a database table and a grouped result set derived from the database table.

FIG. 5 represents a relationship between an example database table 510 and a grouped result set 520 derived from the example database table 510. As shown in FIG. 5, the example database table 510 has five columns $\{C_1, C_2, C_3, C_4, C_5\}$ and M rows $(R_1, R_2, R_3 \ldots R_M)$ with each of the five columns $\{C_1, C_2, C_3, C_4, C_5\}$ containing data having a relationship to data in another column within a common row. For example, assuming that column $C_1$ represents the age of a particular individual in the United States (arbitrarily assigned a range spanning from age 0 to age 119), column $C_2$ could represent the race of the individual (arbitrarily assigned one of ten racial groups), column 3 could represent the sex of the individual, and so on.

The example grouped result set 520 depicts a relationship between columns $C_1$ and $C_2$, i.e., how many people of a given race fall into a particular age group. For the population example immediately above, the left column, indicated as (C1, C2), could contain an indicator that represents a unique set of individuals according to both age and race that numbers N=1,200 rows. Assuming that the grouped result set 520 is based on a 100% sampling of the present population of the United States, then the numbers in the right column of the grouped result set 520 would add up to over 300 million. However, assuming that a 5% random sampling is used, then numbers in the right column would add up to a bit over fifteen million. The example grouped result set 520, once determined, can be conceptually divided into X number of intervals. For instance, the example grouped result set 520 of FIG. 5 could be divided into twenty intervals with the first interval (designated 522-1) representing the first sixty rows, and each subsequent interval (not shown) also representing sixty rows. Assuming that a fetch operation retrieves a collection of two intervals, then the NFE for the example grouped result set 520 is ten. Similarly, assuming that a fetch operation retrieves a collection of five intervals, then the NFE for the example grouped result set 520 is four.

While the example immediately above for FIG. 5 is intentionally simple for purposes of explanation, it is useful to consider a more practical example that has a benefit of reduced input/output operations. For instance, suppose that the total number of rows in a database table is ten million (10,000,000, or "10 M") and 100% sampling is used for generating histograms for the (C1, C2) multi-column group. This requires a full table scan of all ten million rows to generate a grouped result set of "Y" rows on columns (C1, C2). Note that Y is unknown and entirely dependent upon multi-column data distribution in/on a database storage device (e.g., a magnetic disk), and usually known only after fetching the entire the grouped result set from database storage. Accordingly, an NFE can be a dynamically-varying parameter that changes with each fetch operation.

For instance, for a first fetch operation, the rows covered will be equal to the sum of frequency/occurrences of grouped result set of 10,001 rows/size, where 10,001 is a user-set or default parameter. Assuming that the first fetch covers 1 M rows of the table, the number of fetches calculated/estimated (NFE)=10 M/1 M=10.

Next, the maximum number of intervals allowed (IBF) =Total number of intervals for entire operation or across all the fetches=N (e.g. 200) number of intervals to be consumed for histogram generation=(N−Intervals already consumed)/NFE. So, for the first fetch operation, the number of intervals to be consumed (IBF) for histogram generation=(200−0)/10=20. In other words, 1 M rows of the example table is represented by multicolumn histogram (C1, C2), which is a part of a single histogram consisting of 20 bins/buckets/intervals.

Continuing, for the second fetch, the NFE=10 M/(1 M {1st fetch}+3 M {2nd fetch})=10/4=ceil(2.5)=3. So, for the second fetch, the IBF to be consumed for histogram generation=(200−20 {first fetch})/3=60. In other words, at the end of the second fetch, 4 M rows of the table is represented by multicolumn histogram (C1, C2), which is a part of a single histogram consisting of 80 bins/buckets/intervals. The same process can be repeated until all data is consumed. Thus, as can be seen from this example, using an NFE and IBF that both dynamically change throughout the progression of histogram generation can reduced input/output operations.

Figure 6:
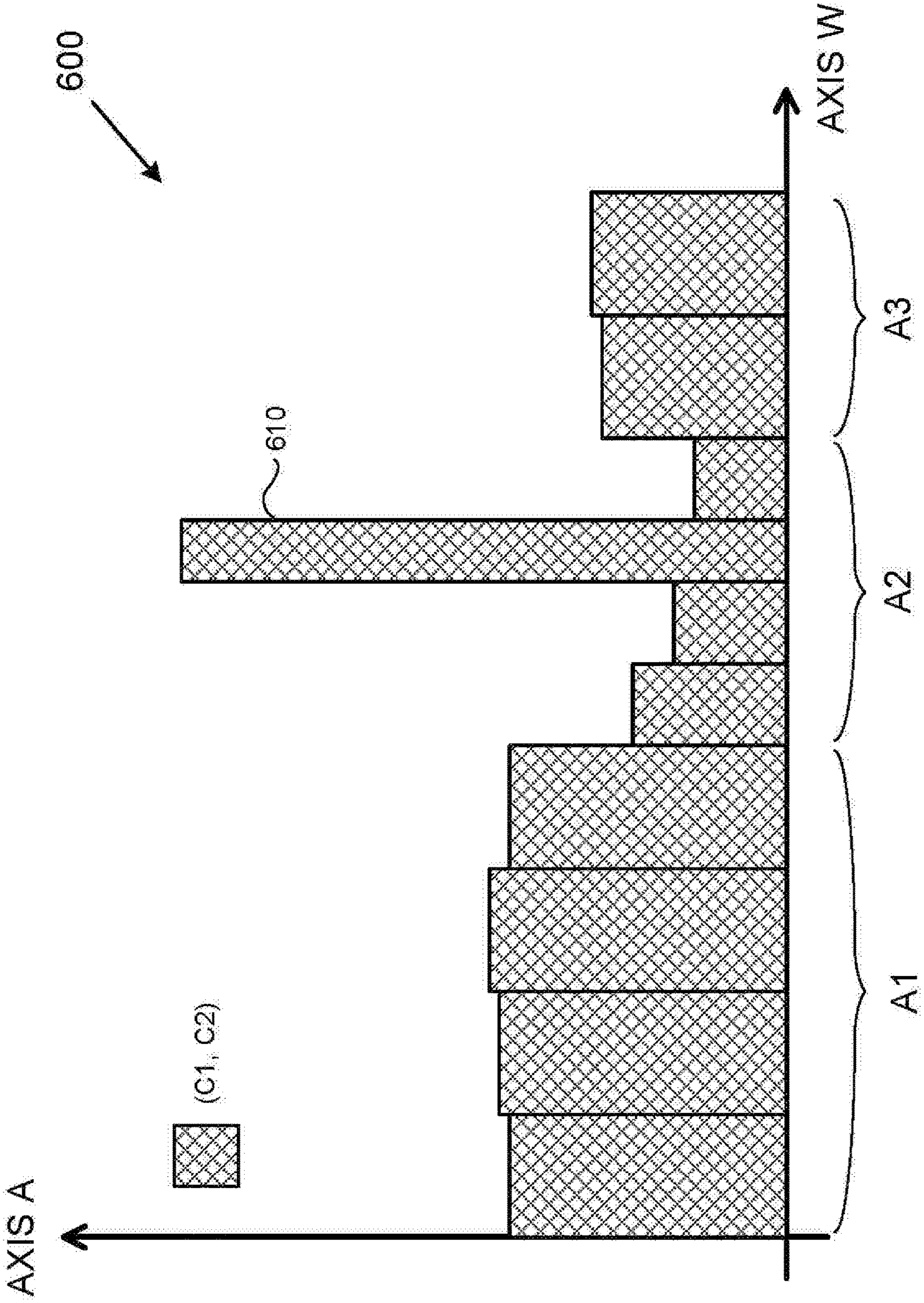
FIG. 6 is an example hybrid histogram rendered by the disclosed methods and systems.

FIG. 6 is an example hybrid histogram 600 produced by the disclosed methods and systems. As shown in FIG. 6, the example hybrid histogram 600 addresses the relationship between two columns {C1, C2} of a database table over a total of ten separate domains/ranges. In the present example, the EquiWidth algorithm was used to render areas A1 and A3, and the Optimal algorithm was used to render area A2. It should be appreciated to those skilled in the art that, had the EquiWidth algorithm solely been used, that the data artifact 610 possibly would not have been accurately represented and even possibly masked in its entirety. In contrast, had the Optimal algorithm been solely used, the overall processing time to process an appropriate histogram would have taken substantially longer due to high memory and computational costs.

Empirical Test of Quality of Histogram Approach

In order to test the validity of the above-described methods and systems, as well as the unique outcomes the above-described methods and systems provide, the inventors devised a synthetic database table having a data set that incorporated a variety of different skew patterns. The database table in consideration has six columns of INTEGER data type and has a seventh column serving as a primary key for the database table. The example database table contains 2,939,999 rows and has a Unique Entry Count (UEC) of 9,340 when the six columns are grouped together. As was verified by SQL's UPDATE STATISTICS command, the data distribution of the resulting grouped result set follows the Zipf pattern with various degree of skewness ranging from 0.06 to 3.04 among the various collections of intervals.

Using the resultant grouped result set, a comparative study was performed using the standard Equiheight histogram on all the fetches versus a mix of the EquiHeight and a custom algorithm applied on a per fetch basis using SQL's UPDATE STATISTICS for full table scan, i.e., 100% sampling. The resultant deviation of selectivity estimate for 15,085 different point queries (equality predicates for six columns being AND'ed together) were then calculated. The final analysis showed an approximate 40% improvement of the total point queries selectivity estimation using the disclosed approach.

Figure 7:
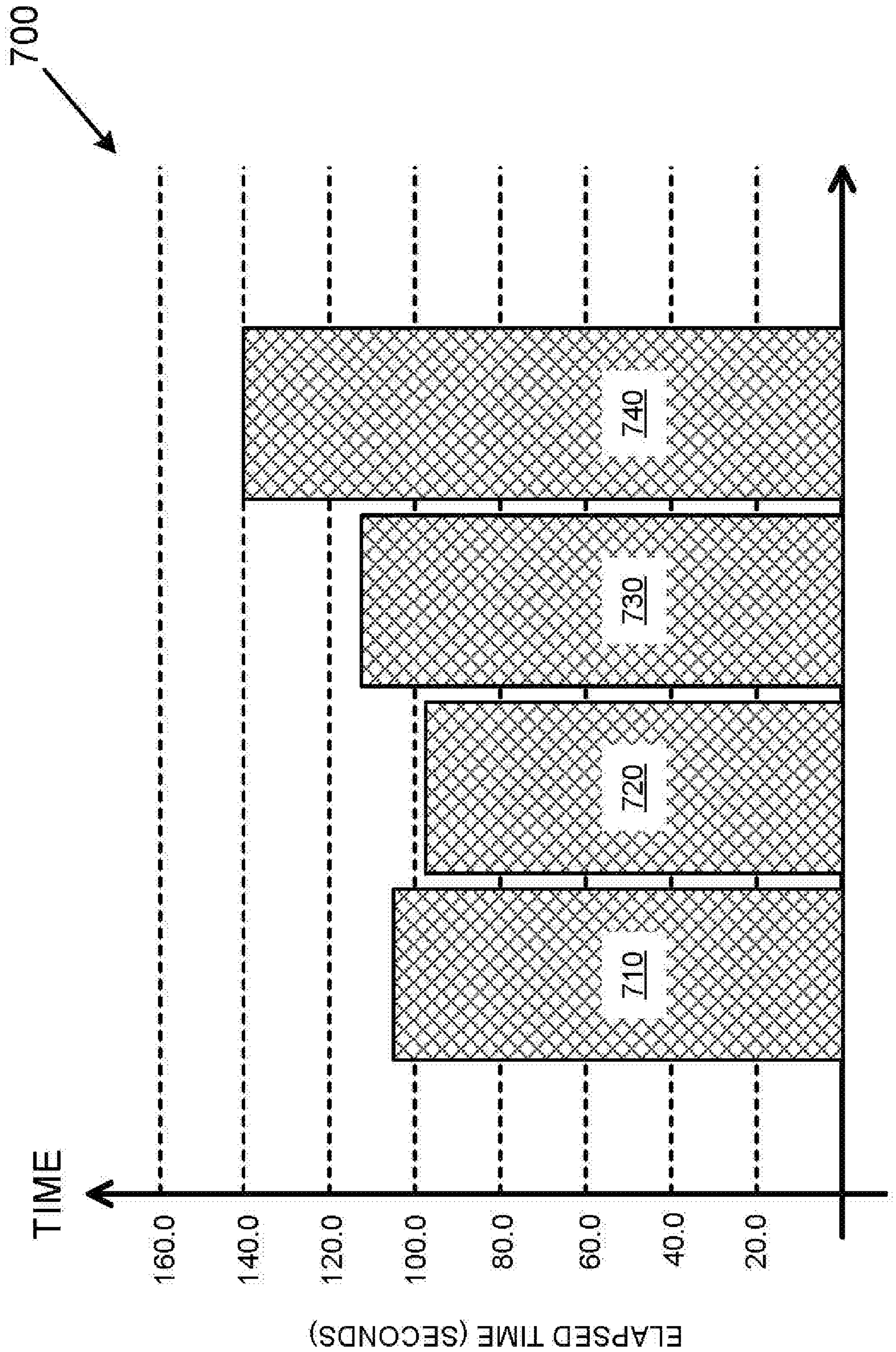
FIG. 7 is a comparative chart of histogram overhead that depicts the computer resources usable to render hybrid histograms using the disclosed methods and systems as compared to histograms rendered using previously known histogram-producing algorithms.

In addition to improved selectivity, the disclosed methods and systems can improve computational overhead while maintaining or improving histogram quality. FIG. 7 is a comparative chart 700 of histogram overhead that depicts the computer resources used to render hybrid histograms using the disclosed methods and systems as compared to histograms rendered using a single previously known histogram-producing algorithm.

As shown in FIG. 7, the comparative chart 700 of histogram overhead includes for entries {710, 720, 730, 740} with the first entry 710 being an entry for the computer overhead, i.e., amount of time that a particular processing system needed to produce a particular, complex histogram using only the EquiHeight algorithm. As is indicated in FIG. 7, the EquiHeight algorithm required a little over one-hundred seconds to render the particular histogram. As is also shown in FIG. 7, the comparative chart 700 of histogram overhead includes a fourth entry 740 being an entry for the computer overhead, i.e., the amount of time that the same particular processing system needed to render a histogram on the same data set, using the Optimal histogram. The Optimal algorithm required about one hundred and forty seconds.

In contrast to the EquiHeight algorithm and the Optimal algorithm, the second entry 720 and the third entry 730 represent two different hybrid approaches. The second entry 720 rendered the same particular histogram as entries 710 and 740 using a hybrid of the EquiHeight algorithm and one other algorithm. The third entry 730 similarly rendered a hybrid histogram using the EquiHeight algorithm and three other algorithms. The point of FIG. 7 is to illustrate that the disclosed methods and systems are usable to balance the total elapsed time in performing histogram generation while maintaining a suitable accuracy of a rendered histogram.

In various examples where the above-described systems and/or methods are implemented using a programmable device, such as a computer-based system or programmable logic, it should be appreciated that the above-described systems and methods can be implemented using any of various known or later developed programming languages, such as "SQL," "C," "C++," "FORTRAN," Pascal," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes. Once an appropriate device has access to the information and programs contained on the storage media/computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A method for producing a histogram, comprising:

using a histogram processing system that includes a processor:

processing a database table to produce a grouped result set, the grouped result set including data that represents a relationship between at least two columns of the database table;

dividing the grouped result set into a plurality of collections with each collection containing one or more intervals of the grouped result set;

for each collection containing one or more intervals, determining one or more statistical parameters characterizing a distribution of the data within the collection containing one or more intervals; and for each collection containing one or more intervals, applying one of a plurality of different histogram-producing algorithms based on the one or more statistical parameters to produce a histogram such that at least two of the different histogram-producing algorithms are used to render a respective different portion of the histogram.

2. The method of claim 1, wherein each collection containing one or more intervals is separately extracted from a database storage device to an operational data memory of the histogram producing system using a fetch operation before applying at least one of the plurality of different histogram-producing algorithms to each of the separately extracted collection containing one or more intervals.

3. The method of claim 1, wherein the one or more statistical parameters for each collection include a skewness parameter that characterizes a skew of the distribution of the data within each collection containing one or more intervals.

4. The method of claim 3, wherein the skewness parameter for each collection containing one or more intervals is based on Pearson's median skewness coefficient.

5. The method of claim 3, wherein applying one of the plurality of histogram-producing algorithms includes:

applying a first histogram-producing algorithm when an absolute value of skew exceeds a first value;

applying a second histogram-producing algorithm when the absolute value of skew exceeds a second value but not the first value; and applying a default histogram-producing algorithm when the absolute value of skew is less than the second value.

6. The method of claim 5, further comprising calculating a Number of Fetches Estimate (NFE), the NFE being an estimate of a number of fetch operations necessary to retrieve an entire grouped result set from database storage into operational data memory, wherein each fetch operation extracts a respective collection containing one or more intervals from database storage;

for each fetch operation, calculating a number of Interval Boundaries per Fetch (IBF), the IBF being a number of intervals of the collection containing one or more intervals retrieved in a respective fetch operation; and for each collection containing one or more intervals, determining whether to apply at least one of the plurality of different histogram-producing algorithms using the IBF as criteria.

7. The method of claim 3, further comprising:

determining whether the histogram processing system has sufficient operational data memory to implement at least one of the plurality of different histogram-producing algorithms; and for each collection containing one or more intervals, applying the at least one of the plurality of different histogram-producing algorithms based on whether the histogram processing system has sufficient operational data memory.

8. The method of claim 1, wherein applying one of the plurality of histogram-producing algorithms includes:

applying a first histogram-producing algorithm when at least one statistical parameter conforms with a first criteria; and applying a second histogram-producing algorithm when at least one statistical parameter conforms with a second criteria, the second criteria being different than the first criteria.

9. A histogram processing system for producing a histogram, comprising:

a processor;

a database storage communicatively coupled to the processor;

operational data memory communicatively coupled to the processor; and program memory communicatively coupled to the processor, wherein the program memory includes instructions that cause the processor to:

process a database table to produce a grouped result set, the grouped result set including data that represents a relationship between at least two columns of the database table;

divide the grouped result set into a plurality of collections with each collection containing one or more intervals of the grouped result set;

for each collection containing one or more intervals, determine one or more statistical parameters characterizing a distribution of the data within the collection containing one or more intervals; and for each collection containing one or more intervals, apply one of a plurality of different histogram-producing algorithms based on the one or more statistical parameters to produce a histogram such that at least two of the different histogram-producing algorithms are used to render a respective different portion of the histogram.

10. The histogram processing system of claim 9, wherein the processor separately extracts each collection containing one or more intervals from database storage to the operational data memory using a fetch operation before applying at least one of the plurality of different histogram-producing algorithms to the each separately extracted collection containing one or more intervals.

11. The histogram processing system of claim 9, wherein the one or more statistical parameters for each collection include a skewness parameter that characterizes a skew of the distribution of the data within each collection containing one or more intervals.

12. The histogram processing system of claim 11, wherein the skewness parameter for each collection is based on Pearson's median skewness coefficient.

13. The histogram processing system of claim 11, wherein when applying one of the plurality of histogram-producing algorithms, the processor:

applies a first histogram-producing algorithm when an absolute value of skew exceeds a first value;

applies a second histogram-producing algorithm when the absolute value of skew exceeds a second value but not the first value; and applies a default histogram-producing algorithm when the absolute value of skew is less than the second value.

14. The histogram processing system of claim 13, wherein the processor further:

calculates a Number of Fetches Estimate (NFE), the NFE being an estimate of a number of fetch operations necessary to retrieve an entire grouped result set from database storage into the operational data memory, wherein each fetch operation extracts a respective collection containing one or more intervals from database storage;

for each fetch operation, calculates a number of Interval Boundaries per Fetch (IBF), the IBF being a number of intervals of the collection containing one or more intervals retrieved in a respective fetch operation; and for each collection containing one or more intervals, determines whether to apply at least one of the plurality of different histogram-producing algorithms using the IBF as criteria.

15. The histogram processing system of claim 11, wherein the processor determines whether the histogram processing system has sufficient operational data memory to implement at least one of the plurality of different histogram-producing algorithms; and for each collection containing one or more intervals, the processor applies the at least one of the plurality of different histogram-producing algorithms based on whether the histogram processing system has sufficient operational data memory to implement the at least one of the plurality of different histogram-producing algorithms.

16. The histogram processing system of claim 9, wherein when applying one of the plurality of histogram-producing algorithms, the processor:

applies a first histogram-producing algorithm when at least one statistical parameter conforms with a first criteria; and applies a second histogram-producing algorithm when at least one statistical parameter conforms with a second criteria, the second criteria being different than the first criteria.

17. A computer program product, comprising:

a non-transient computer-readable storage memory containing a plurality of instructions such that, when operated upon by a processing system that includes a processor, a database storage communicatively coupled to the processor and operational data memory communicatively coupled to the processor, causes the processor to:

process a database table to produce a grouped result set, the grouped result set including data that represents a relationship between at least two columns of the database table;

divide the grouped result set into a plurality of collections with each collection containing one or more intervals of the grouped result set;

for each collection containing one or more intervals, determine one or more statistical parameters characterizing a distribution of data within the collection containing one or more intervals; and for each collection containing one or more intervals, apply one of a plurality of different histogram-producing algorithms based on the one or more statistical parameters to produce a histogram such that at least two of the different histogram-producing algorithms are used to render a respective different portion of the histogram.

18. The computer program product of claim 17, wherein the one or more statistical parameters for each collection include a skewness parameter that characterizes a skew of the distribution of data within each collection containing one or more intervals.

19. The computer program product of claim 18, wherein applying one of the plurality of different histogram-producing algorithms, the processor:

applies a first histogram-producing algorithm when an absolute value of skew exceeds a first value;

applies a second histogram-producing algorithm when the absolute value of skew exceeds a second value but not the first value; and applies a default histogram-producing algorithm when the absolute value of skew is less than the second value.

20. The processing system of claim 17, wherein when applying one of the plurality of different histogram-producing algorithms, the processor:

applies a first histogram-producing algorithm when at least one statistical parameter conforms with a first criteria; and applies a second histogram-producing algorithm when at least one statistical parameter conforms with a second criteria, the second criteria being different than the first criteria.

* * * * *